J. A. GARDNER.
TOBACCO TRUCK.
APPLICATION FILED NOV. 26, 1919.
1,363,245.
Patented Dec. 28, 1920.
2 SHEETS—SHEET 2.
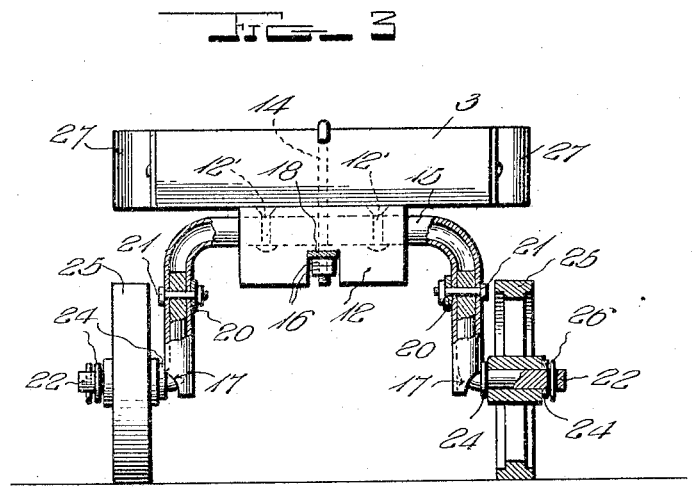
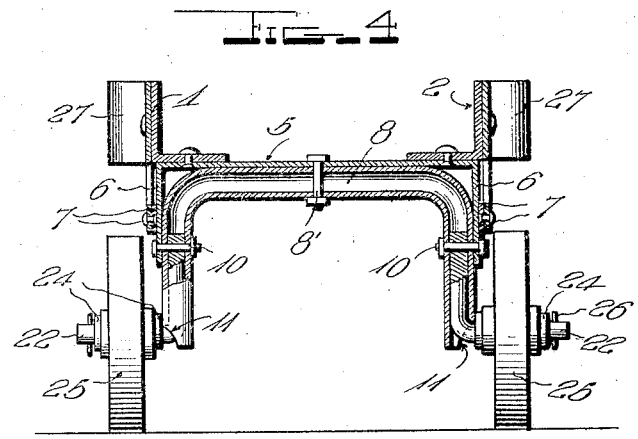
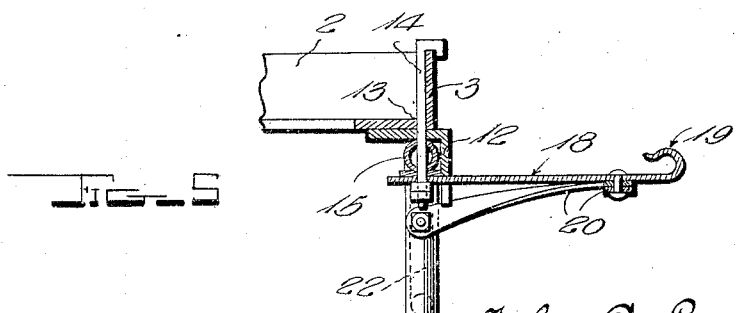
Inventor
John A. Gardner
By H. B. Wilson & Co.
Attorneys

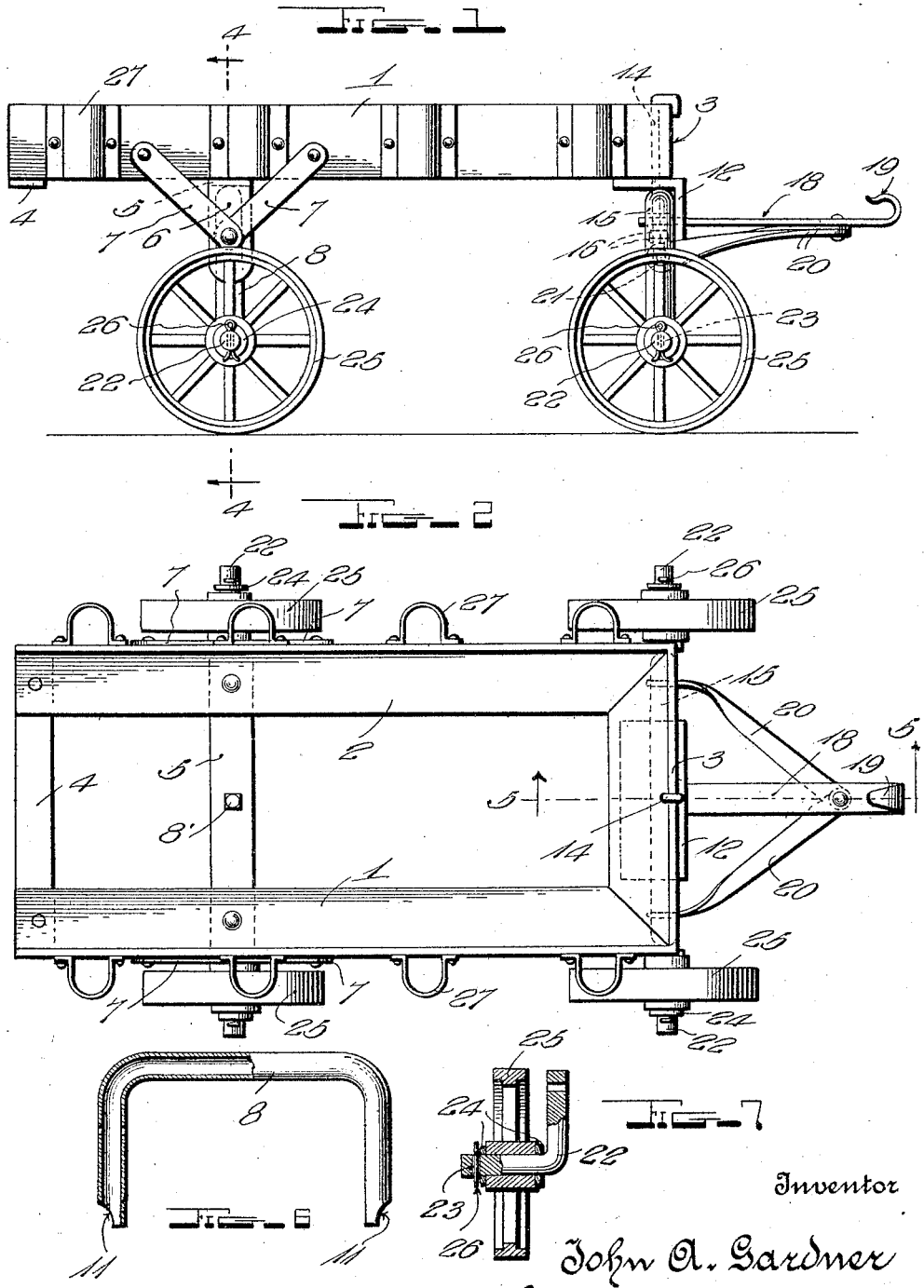

UNITED STATES PATENT OFFICE.

JOHN A. GARDNER, OF GRIFTON, NORTH CAROLINA, ASSIGNOR OF ONE-HALF TO C. C. COBB, OF NORFOLK, VIRGINIA.

TOBACCO-TRUCK.

1,363,245.      Specification of Letters Patent.      Patented Dec. 28, 1920.

Application filed November 26, 1919. Serial No. 340,699.

*To all whom it may concern:*

Be it known that I, JOHN A. GARDNER, a citizen of the United States, residing at Grifton, in the county of Pitt and State of North Carolina, have invented certain new and useful Improvements in Tobacco-Trucks; and I do declare the following to be a full, clear, and exact description of the invention, such as will enable others skilled in the art to which it appertains to make and use the same.

This invention relates generally to vehicles, and more particularly to tobacco trucks used when picking and hauling tobacco from the field.

One object of the invention is to provide a truck which is adapted in size and shape so as to be drawn between the rows of growing tobacco without contacting with and injuring the same, and which may be turned through an extremely small radius.

Another object of the invention is to provide a truck of this character with reversible stub axles which carry the wheels, so that in case the axles become worn they may be disconnected and reversed so as to present new surfaces to the wheel hubs.

A further object of the invention is to provide a truck of this character having a simple and improved fifth wheel construction.

An additional object of the invention is to generally improve upon devices of this nature by the provision of a comparatively simple, strong, durable and inexpensive construction, and one which will be well adapted to the purpose for which it is designed.

With these and other objects in view, the invention consists of the novel features of construction, and the combination and arrangement of parts as will be hereinafter fully described and claimed.

In the accompanying drawings in which similar reference characters designate like parts throughout the several views:

Figure 1 is a side elevation of a truck constructed in accordance with this invention.

Fig. 2 is a top plan view of the same.

Fig. 3 is a front elevation of the truck.

Fig. 4 is a transverse sectional view taken substantially on the plane indicated by the line 4—4 of Fig. 1.

Fig. 5 is a detail longitudinal sectional view taken on the plane indicated by the line 5—5 of Fig. 2.

Fig. 6 is a detail sectional view through one of the arched axles removed from the truck.

Fig. 7 is a detail sectional view showing one of the stub axles.

The main portion of the body of the truck is made from a single piece of angle metal bent into a U-shape to form a pair of longitudinal bars 1 and 2 and a transverse bar 3 connecting them at their forward ends. Obviously before the piece of angle metal is bent into this shape one of its flanges is formed with right angular notches at the points of the bends in the other flanges so that this bending can be done. The rear ends of the bars 1 and 2 are connected by a cross-bar 4 which is riveted or otherwise firmly secured to the horizontal flanges thereof. Another cross-bar 5 disposed a slight distance forwardly of the cross-bar 4 is secured by rivets or other suitable means to the horizontal flanges of the bars 1 and 2. The ends of the cross-bar 5 are down-turned as at 6, and secured at one of their ends to these downturned portions 6 are braces 7 which have their other ends secured to the upright flanges of the side bars 1 and 2. The numeral 8 designates an arched tubular axle disposed beneath and within the cross-bar 5 and its ends 6 and secured at its intermediate portion to the cross-bar 5 by means of a bolt and nut 8'. The downturned or depending portions of the axle 8 are secured to the downturned ends 6 of the cross-bars 5 by means of bolts and nuts 10. As shown, the extremities of the depending portions of the axle 8 are notched out on their outer sides as at 11 to provide pairs of inwardly and downwardly facing shoulders for a purpose to be hereinafter set forth.

The horizontal flange of the bar 3 is provided with an opening 13 adjacent the upright flange of the bar 3, and extended through this opening is a king bolt 14, the upper end of which is bent downwardly into a hook-shape and overhanging or hooking over the upper edge of the upright flange of the bar 3. The lower end of the king bolt 14 extends through the intermediate portion of an inverted U-shaped or arched tubular axle 15 and is provided with nuts 16, and also the longitudinal flange of a piece of angle metal 12 secured to the intermediate portion of said arched axle by means of rivets 12'. The horizontal flange of the member 12 bears against the lower surface of the horizontal flange of the cross bar 3. The extremities of the depending portions of the axle 15 are provided with notches 17 on their outer sides similar to the notches 11 and provide similar pairs of shoulders. The purpose of these shoulders will be hereinafter described.

The forward axle 15 is provided with suitable draft means adapted to be used when the vehicle is being drawn. The means herein shown consists of a short tongue 18 having a hook 19 at its forward end and being connected to the king bolt at its rear end. Braces 20 disposed between the tongue 18 and the depending portions of the axle 15 maintains the tongue at all times at right angles to the plane of the axle. The means for fastening the rear ends of the braces 20 to the depending portions of the axle 15 consists of bolts and nuts 21 which extend through the axle.

The numeral 22 designates stub axles which are right-angular or L-shaped, the two portions of which are of equal length and are provided adjacent their ends with transverse openings 23. One of the portions or arms of these stub axles 22 are disposed in the depending portions of the arched axles 8 and 15 and the openings 23 therein receive the bolts 10 and 21 whereby said stub axles are secured to the arched axles. The other arms or portions of the stub axles 22 extend outwardly at right angles to the downturned portions of the arched axles through the notches 11 and 17 or between the shoulders on opposite sides of these notches. These shoulders face inward or toward one another and abut against the upper and upright surfaces of the horizontal part of the contiguous stub-axle. By this construction any tendency on the part of the stub axles to turn in the depending portions of the axles is overcome. Mounted upon the outwardly extending arms or portions of the stub axles between washers 24 are wheels 25, the latter being smaller in diameter than the height of the lower surface of the truck body and being maintained on the stub axles by means of cotter pins 26 which are disposed in the openings 23 of the outwardly extending portions of the stub axles.

Any suitable floor may be placed upon the horizontal flanges of the longitudinal bars 1 and 2 and forward cross-bar 3 of the truck body. The upright flanges of the longitudinal bars 1 and 2 have secured to their outer sides sockets 27 adapted to receive posts (not shown) for supporting the sides (not shown) of the truck.

The truck is comparatively narrow and long so that it can be drawn between the rows of growing tobacco without contacting with or injuring the tobacco in any way.

The arched axles adapt the truck to clear stubble or other obstructions which may be in its path. By having the wheels, especially the front wheels, of less diameter than the height of the lower surface of the truck frame, it is possible to turn the truck through a comparatively small radius.

In case the portions of the stub axles on which the wheels are mounted become worn, the stub axles can be reversed, that is, they may be detached from the arched axles and the wheels placed upon the portions which were previously disposed in the depending portions of the arched axles. The openings 23 are placed so as to be in the proper position to receive the cotter pins or the bolts by which the stub axles are secured to the arched axles.

The fifth wheel construction in addition to being extremely simple is very strong and durable as the king bolt hooking over the upper edge of the upright flange of the forward cross-bar as it does prevents it from twisting or otherwise becoming displaced.

From the foregoing description, taken in connection with the accompanying drawings, the construction, use and operation of the device will be readily understood.

Various changes in form, proportion and in the minor details of construction may be resorted to without departing from the spirit of the invention as defined in the appended claims.

What is claimed is:

1. A tobacco truck comprising a body having a right angular cross-bar at its forward end, a king bolt extending through the horizontal flange of said cross-bar adjacent the vertical flange thereof and having its upper end downturned and hooked over the upper edge of said vertical flange, an arched axle secured to the lower end of said king bolt, a right angular plate carried by said axle and having its horizontal flange bearing against the horizontal flange of said cross-bar, another arched axle fixed to said body, and wheels mounted upon the depending portions of said axles.

2. A truck comprising a body, arched axles secured to said body and having depending portions, the lower ends of said depending portions being tubular and provided with a pair of downwardly and inwardly facing shoulders, one-piece L-shaped stub axles each having one of its limbs extending up into and secured to one of the depending portions of said arched axles, the other limb of each L-shaped stub axle extending horizontally between the adjacent shoulders of the contiguous one of said pairs to prevent turning of the stub axle with relation to said arched axles, and wheels mounted on the horizontal portions of said stub axles.

3. A truck comprising longitudinal bars and a forward cross bar, these bars being formed of a single piece of angle beam bent into U-shape, a cross bar extending between and secured to the rear end portions of said longitudinal bars and having depending end portions, an arched rear axle fitted between and secured to the depending ends of the last mentioned cross bar, a front axle turnably secured to said forward cross bar and ground wheels journaled on said axles.

In testimony whereof I have hereunto set my hand.

JOHN A. GARDNER.